United States Patent
Ekman

(10) Patent No.: US 6,807,422 B1
(45) Date of Patent: Oct. 19, 2004

(54) LOGICAL CHANNEL CONTROL PROCEDURES FOR HANDOVER

(75) Inventor: Jani Ekman, Tampere (FI)

(73) Assignee: Nokia Corporation, Espoo (FI)

( * ) Notice: Subject to any disclaimer, the term of this patent is extended or adjusted under 35 U.S.C. 154(b) by 516 days.

(21) Appl. No.: 09/717,534

(22) Filed: Nov. 21, 2000

(30) Foreign Application Priority Data

Nov. 25, 1999 (GB) .............................. 9927890

(51) Int. Cl.[7] .............................................. H04Q 7/20
(52) U.S. Cl. .................... 455/439; 455/432.1; 455/436; 370/331; 370/355
(58) Field of Search .................... 455/432.1–432.3, 455/439, 445, 455, 560, 436; 370/310.2, 328, 331, 352, 355, 356

(56) References Cited

U.S. PATENT DOCUMENTS

| | | | | |
|---|---|---|---|---|
| 5,457,680 A | * | 10/1995 | Kamm et al. ............... | 370/332 |
| 5,652,866 A | * | 7/1997 | Aldred et al. ................. | 703/23 |
| 6,404,746 B1 | * | 6/2002 | Cave et al. .................. | 370/262 |
| 6,408,184 B1 | * | 6/2002 | Kallio et al. ................ | 455/445 |
| 6,424,638 B1 | * | 7/2002 | Ray et al. .................... | 370/331 |
| 6,519,235 B1 | * | 2/2003 | Kim et al. .................... | 370/331 |
| 6,539,237 B1 | * | 3/2003 | Sayers et al. ................ | 455/555 |

FOREIGN PATENT DOCUMENTS

| | | | | |
|---|---|---|---|---|
| EP | 0664658 A2 | | 7/1995 | |
| GB | WO98-17048 | * | 4/1998 | ............ H04M/3/50 |
| SE | WO98-59467 | * | 12/1998 | ........... H04L/12/46 |
| WO | WO 00/48417 | | 8/2000 | |
| WO | WO 00/60894 | | 10/2000 | |
| WO | WO 00/67514 | | 11/2000 | |
| WO | WO 01/30107 | | 4/2001 | |
| WO | WO 01/30109 | | 4/2001 | |

OTHER PUBLICATIONS

Andras Valko, "Cellular IP: A new approach to Internet host mobility", Computer Communications Review, NY, vol. 29, No. 1, Jan. 1999, pp. 50–65.*

Andras G. Valko; "Cellular IP: A New Approach to Internet Host Mobility", Computer Communications Review, US, Association for Computing Machinery, New York, vol. 29, No. 1, Jan. 1999, pp. 50–65.

International Search Report for GBA 9927890.

* cited by examiner

*Primary Examiner*—William Trost
*Assistant Examiner*—Stephen D'Agosta
(74) *Attorney, Agent, or Firm*—Squire, Sanders & Dempsey L.L.P.

(57) ABSTRACT

A method of effecting handover in a communications network of a first mobile station between a source and a target gateway is provided. The first mobile station engages in a call with a second mobile station using a destination gateway. The source gateway, the target gateway and the destination gateway are connected by a switched packet communication path for conveying call data packets. The method sends call data packets from the first mobile station to a source port at the destination gateway. The method opens a target port at the destination gateway for communication with the target gateway and routes call data packets from the first mobile station via the target gateway to the target port on the switched packet communication path. The method detects receipt of the call data packets at the target port and routes the call data packets from the second mobile station to the target gateway.

9 Claims, 8 Drawing Sheets

LOGICAL CHANNEL CONTROL PROCEDURES FOR HANDOVER

BACKGROUND OF THE INVENTION

1. Field of the Invention

The present invention is related to handovers in a communication system and particularly, but not exclusively, to mobile telephone station handovers in an IP-based telecommunications network.

2. Description of the Related Art

Prior art office-based communications systems usually operate conventional fixed-line telephone units linked via an internal switchboard or PBX (private branch exchange). Such fixed-line systems are able to provide relatively high voice quality. However, user mobility is severely impaired.

The advent of digital mobile technologies such as GSM (Global system for mobile communications) however, means that mobile systems can now provide at least the equivalent voice quality as fixed-line systems. Mobile systems also allow greater freedom of movement for the user within the office than do fixed-line systems.

WIO (Wireless Intranet Office) is a proprietary communications system developed by the applicants which introduces the concept of utilising mobile telephone units, such as conventional GSM mobile stations, in an office environment. The system makes use of a known concept called Internet Telephony or Voice-over-IP. (IP is internet protocol).

Voice-over-IP is a technology which allows audio, data and video information to be transmitted over existing IP-based Local or Wide Area Networks or the Internet. The technology thus provides for convergence and integration of three different media types over the same network.

Prior to the advent of Voice-over-IP, offices often operated three separate networks for the transmission of these media types. As indicated above, fixed-line telephone systems coupled to an in-house PBX provided for voice communication, an officebased LAN (local area network) or Intranet (i.e. a packet-switched internal network), comprising computer terminals linked via network cards and under the control of a server station, provided for the transmission of "conventional" computer data and video cameras linked to monitors via fixed line or remote transmission link provided for video communication.

Voice-over-IP effectively combines these three media types such that they can be transmitted simultaneously on the same packet-switched network or IP-router throughout the office environment and beyond the confines of the office.

In order to provide for such media convergence, Voice-over-IP often uses a specific ITU (International Telecommunication Union) standard protocol to control the media flow over the Intranet. One common standard protocol used in Voice-over-IP systems, and the one used in the WIO system, is termed H.323.

H.323 is an ITU standard for multimedia communications (voice, video and data) and allows multimedia streaming over conventional packet-switched networks. The protocol provides for call control, multimedia management and bandwidth management for both point-to-point (2 end-users) and multipoint (3 or more end-users) conferences. H.323 also supports standard video and audio codes (compression/decompression methods such as MPEG) and supports data sharing via the T.120 standard.

Furthermore, H.323 is network, platform and application independent allowing any H.323 compliant terminal to operate in conjunction with any other terminal.

The. H.323 standard defines the use of three further command and control protocols:
a) H.425 for call control;
b) Q.931 for call signalling; and
c) The RAS (Registrations, Admissions and Status) signalling function.

The H.425 control channel is responsible for control messages governing the operation of the H.323 terminal including capability exchanges, commands and indications. Q.931 is used to set up a connection between two terminals. RAS governs registration, admission and bandwidth functions between endpoints and gatekeepers which are discussed later.

For a H.323 based communication system, the standard defines four major components:
1. Terminal
2. Gateway
3. Gatekeeper
4. Multipoint Control Unit (MCU)

Terminals are the user end-points on the network, e.g. a telephone, mobile or fixed, or a fax unit or a computer terminal. All H.323 compliant terminals must support voice communications, but video and data support is optional.

Gateways connect H.323 networks to other networks or protocols. For an entirely internal communications network i.e. with no external call facility, gateways as such are not required. However, a circuit providing the internal function of a gateway would normally be present. References to a gateway in the present description refers to any circuit providing the necessary gateway functions for internal or external communication.

Gatekeepers are the control center of the Voice-over-IP network. It is under the control of a gatekeeper that most transactions (communication between two terminals) are established. Primary functions of the gatekeeper are address translation, bandwidth management and call control to limit the number of simultaneous H.323 connections and the total bandwidth used by those connections. An H.323 "zone" is defined as the collection of all terminals, gateways and multipoint-control units (MCU—defined below) which are managed by a single gatekeeper.

Multipoint Control Units (MCU) support communications between three or more terminals. The MCU comprises a multipoint controller (MC) which performs H.425 negotiations between all terminals to determine common audio and video processing capabilities, and a multipoint processor (MP) which routes audio, video and data streams between terminals.

The conventional Voice-over-IP system described herein above normally utilise standard fixed-line telephone systems which are subject to the disadvantages outlined above, namely the lack of mobility and the lack of user commands.

The WIO concept takes Voice-over-IP further in that it provides for the use of conventional mobile telephone units, such as GSM mobile stations, within the Voice-over-IP system. To provide for such mobile communications within an intra-office communication network, WIO combines known Voice-over-IP, as described above, with conventional GSM-based mobile systems.

Thus, intra-office calls are routed through the office intranet and extra-office calls are routed conventionally through the GSM network. Such a system provides most or all of the features supported by the mobile station and the network such as telephone directories, short messaging, multiparty services, data calls, call barring, call forwarding etc. WIO, therefore, provides for integrated voice, video and data communications by interfacing an H.323-based voice-over-IP network with a GSM mobile network.

The WIO system is a cellular network, similar to the conventional GSM network and is divided into H.323 Zones as described above.

One H.323 Zone may comprise a number of cells. Two or more H.323 zones may be contained within an administrative domain. The allocation of H.323 zones to an administrative domain is an issue primarily concerning billing and is therefore not relevant to this invention.

Given the cellular nature of the WIO system, a major issue to be solved is that of handovers (sometimes known as handoff) i.e. the hand-off of control of a mobile station from a first cell in the network to a second cell in the network. A similar consideration applies to mobile stations in the conventional GSM network.

In such conventional GSM systems, the need for a handover of a mobile station to a different cell of the network is based on measurements made by the mobile station of the strength of signals transmitted from several base transceiver stations.

If the level of a signal transmitted by a base transceiver station, located in a different cell from that of the mobile, reaches a certain threshold level in relation to that of the base transceiver station located in the mobile station's current cell, handover of the mobile station is required and a handover request is issued to the network controller (mobile switching center).

In a similar manner, a mobile station operating in the WIO system is able to determine its position within the WIO network by comparing the signal strengths of the signals received by several base stations, in different cells, in the network.

However, added complexities arise for handovers in the WIO system since a mobile unit operating therein is not only able to move between cells within the WIO system, but also between zones and even between the WIO system itself and an external GSM network.

It can be seen, therefore, that there are several different types of handovers which may need to be executed in the normal operation of a WIO system. These types of handovers are:

a) The handover of a mobile from one WIO cell to another whilst in communication with another mobile.
b) The handover of a mobile from one WIO zone to another whilst in communication with another mobile.
c) The handover of a mobile from a cell within the WIO system to a cell within an external GSM system while in communication with another mobile and vice versa.

Handovers according to the types listed above are also subject to the conditions under which any ongoing call is made, such as the instantaneous location of each mobile station and the location of each mobile station when the call was set up.

During the handover of a mobile station from a first cell to a second cell, it is quite possible that a certain amount of data will be lost since the communications links from the second cell may not be fully set up when the communications links from the first cell are disconnected. It is preferable, therefore, to provide a handover procedure wherein the communications links from the first cell are not disconnected until the communications links from the second cell are fully set up.

SUMMARY OF THE INVENTION

According to one aspect of the present invention there is provided a method of effecting handover in a cellular communications network of a first mobile station between a source gateway and a target gateway, the first mobile station being engaged in a call with a second mobile station using a destination gateway wherein the source gateway, the target gateway and the destination gateway are connected by a switched packet communication path for conveying call data packets, the method comprising: i) opening a target port at the destination gateway for communication with the target gateway; ii) routing call data packets from the first mobile station via the target gateway to the target port on the switched packet communication path; iii) detecting receipt of said call data packets at the target port; and then, responsive to such detection, iv) routing call data packets from the second mobile station via the destination gateway to the target gateway on the switched packet communication path.

Another aspect of the invention provides a cellular communications network comprising: a plurality of gateways connected via a switched packet communication path for conveying call data packets between the gateways, each gateway being associated with circuitry for converting RF data from a mobile station to call data packets for transmission via the switched packet communication path, and each gateway having a set of selectable ports for transmitting and receiving call data packets on the switched packet communication path, the network further comprising: a central controller connected to the switched packet communication path and operative responsive to a handover required indication from a mobile station operating in the network to selectively open and close said ports to implement handover of the mobile station from one of said gateways to another of said gateways.

For a better understanding of the present invention, and to show how the same may be carried into effect, the present invention will now be described in more detail with reference to the accompanying drawings in which:

DETAILED DESCRIPTION OF THE PREFERRED EMBODIMENTS

Figure 1A:
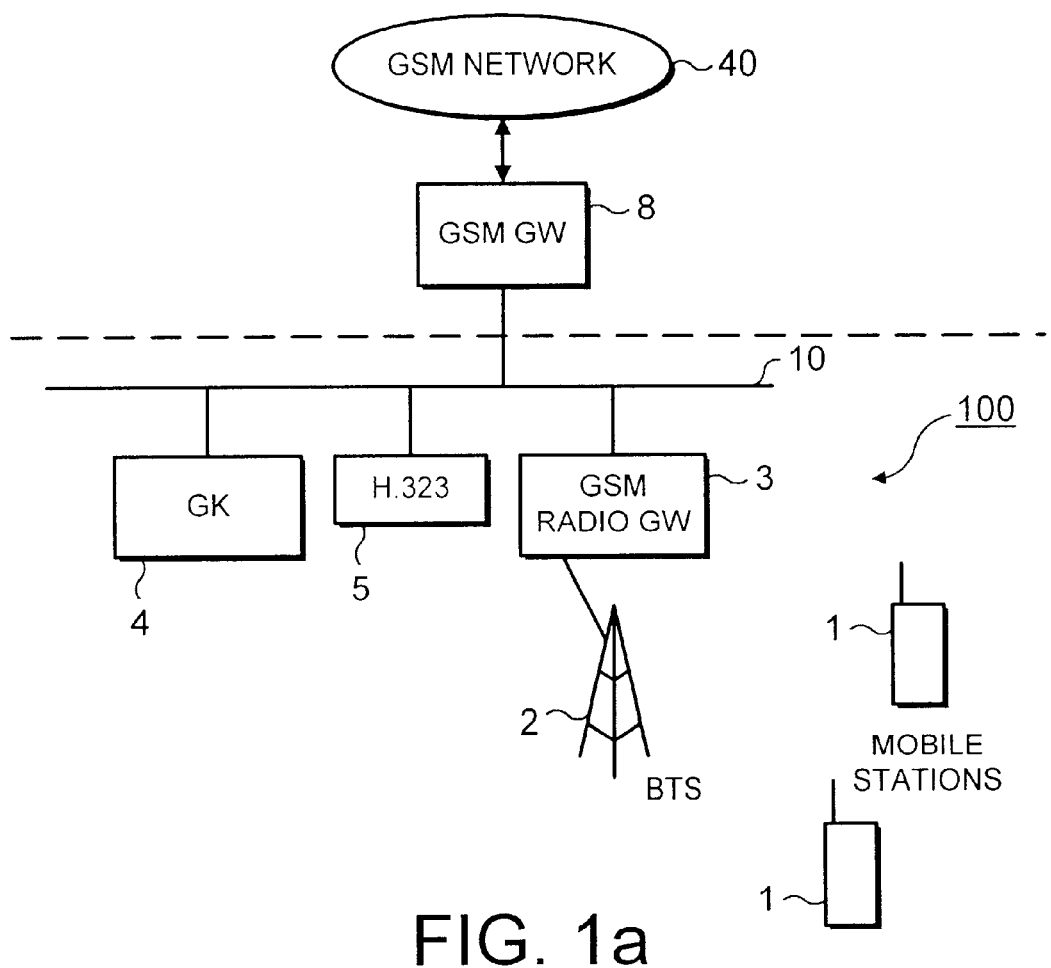
FIG. 1a is a block diagram showing some of the components used in the implementation of a WIO system.

In the office environment, denoted by the dashed box 100 in FIG. 1, within which the WIO system is implemented, there is an IP (Internet Protocol) LAN 10. The LAN 10 is operable to carry standard packet form data.

One or more mobile stations (MS) 1 communicate, i.e. transmit RF signals to and/or receive signals from, a base transceiver station (BTS) 2. The base transceiver station 2 used in the WIO system is similar to base transceiver stations used in conventional GSM mobile communications systems in that it is connected to, and operates in conjunction with, a controller. In a conventional GSM system, the controller is termed a base station controller (BSC); in WIO, however, the controller is represented by a GSM radio access gateway 3, the function of which will be described later.

The base transceiver station 2 receives RF signals transmitted by the mobile unit 1 and forwards them in a call format to the GSM radio access gateway 3. The GSM radio access gateway 3 is also connected to the LAN 10.

A WIO Gatekeeper (WGK) 4 is connected to the LAN 10 as is an H.323 terminal (H.323) 5. The H.323 terminal 5 may be represented by a computer terminal which supports voice information.

Connected to the LAN 10 is a GSM gateway 8. The GSM gateway 8 is also connected to a standard GSM network 40 as used in a conventional mobile communication system. The network is sometimes referred to as a public land network. The WIO system allows for the use of mobile telephone in the office environment to make both internal and external office calls. The functions of each of the components of FIG. 1 will now be described in more detail.

The GSM radio access gateway 3 performs similar functions to that of a base station controller in a conventional GSM network such as the management of radio resources and channel configuration and the handling of the base transceiver station configuration. However, the GSM radio access gateway 3 also provides conversion from GSM voice data to packet based data suitable for transmitting on the packet-based LAN 10.

During a call, therefore, the GSM radio access gateway 3 converts the voice data in call format transmitted by the base station into packet-based call data suitable for transmitting on the LAN 10.

The GSM radio access gateway 3 normally (but not always) controls a single base transceiver station. However, the GSM radio access gateway 3 is operable to convey more than one call through it simultaneously. To achieve this, it comprises a number of "ports". Each port has a particular IP address. The IP addresses are always the same for one network interface and these ports are identified with port numbers. A particular port will receive only that data which is sent to its specific address. Thus if a particular component within the WIO system such as second GSM radio gateway wishes to communicate with it, the first GSM radio gateway has to open the required port and then the second GSM radio gateway must send its data to the address of that port.

The WIO Gatekeeper 4 is the main controller of the WIO system and has a high processing capability. Its function is to provide control services to the LAN 10 and the various user terminals. However, the WIO Gatekeeper 4 is also responsible for all of the functions which the H.323 protocol defines to its gatekeeper, including call management and call signalling. It is also responsible for mobility management. The WIO Gatekeeper 4 is able to manage the main different call types such as voice, data, facsimile and conference calls which can be established between a mobile station, a PC terminal and a normal telephone in any combination.

The GSM gateway 8 handles communication between the WIO environment and the GSM network via the mobile switching center (MSC). From the MSC viewpoint, the WIO appears to be a conventional base station system. The GSM gateway 8 also provides isolation means for disconnecting the WIO system from the MSC in the event of WIO system failure.

The telephone calls managed by the WIO system can be divided into internal calls and external calls. Internal calls are those calls where both mobile stations involved in the call are located within the WIO system, and external calls involve a mobile station which is not located within the WIO system.

Figure 1B:
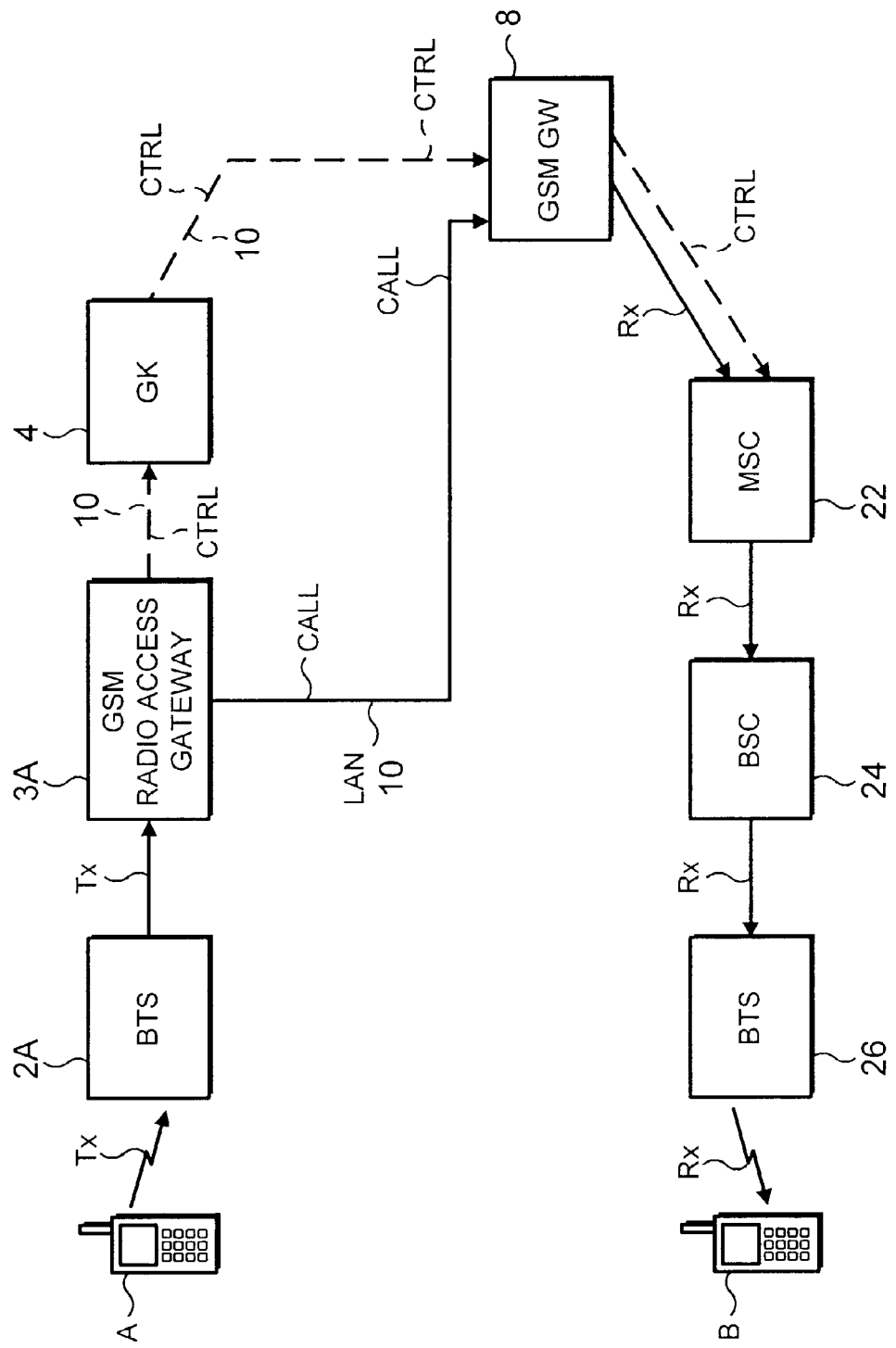
FIG. 1b is a block diagram illustrating the communication pathways used during a call between an internal mobile station and an external mobile station.

The functions of the WIO system components described above will now be described, with reference to FIG. 1b, in the context of a telephone call from a mobile station located within the WIO system (mobile A) to a mobile station located in an external network such as a GSM network (mobile B).

A first mobile station A transmits a radio frequency (RF) transmission signal TX, on a predetermined communication channel, to the base transceiver station 2 in a format conventional to GSM communications systems such as a timeslot format. The communication channel on which the mobile station A transmits the RF transmission signal TX is determined in a manner conventional to GSM communication systems.

A first base transceiver station 2A receives the RF 40 transmission signal, down-converts it and then forwards it to the GSM radio access gateway 3A controlling the BTS 2A. In this respect, the base transceiver station 2A and the GSM radio access gateway 3A operate in a manner similar to a base transceiver station and a base station controller respectively in a conventional GSM network.

The GSM radio access gateway 3A receives the down-converted transmission signal from the base transceiver station 2 and converts it from the conventional GSM time-slot format, to call data in a packet-based format which allows it to be transmitted along the LAN 10 to the GSM gateway 8. Also, the GSM radio gateway 3A composes a control signal CTRL which may include, for example, identification of the destination mobile unit, the IP address corresponding to that mobile unit and/or identification of the source mobile unit.

The control signal is then routed, in packet format, via the LAN 10, to the gatekeeper 4 which, based on the information contained in the control signal CTRL, determines whether the destination mobile station B is located within the WIO system or external to the WIO system. If the mobile station B lies outside the WIO system, e.g. a conventional GSM mobile unit operating in the GSM network, the packet-based call signal CALL is routed along the LAN 10 to the GSM gateway 8.

The GSM gateway 8 converts the call signal CALL from the packet-based format into a conventional GSM format such as a time-slot format. The converted call signal thus becomes the receive signal RX. The call signal CALL is also sent to destination identified in control signal CTRL (mobile station B).

The receive signal RX, in timeslot format, is forwarded from the GSM gateway 8 to a mobile switching center (MSC) 22 in the GSM network from where it is transmitted to the respective base station controller 24 and base transceiver station 26, under which the mobile station B is operating, in a manner conventional to GSM.

Figure 1C:
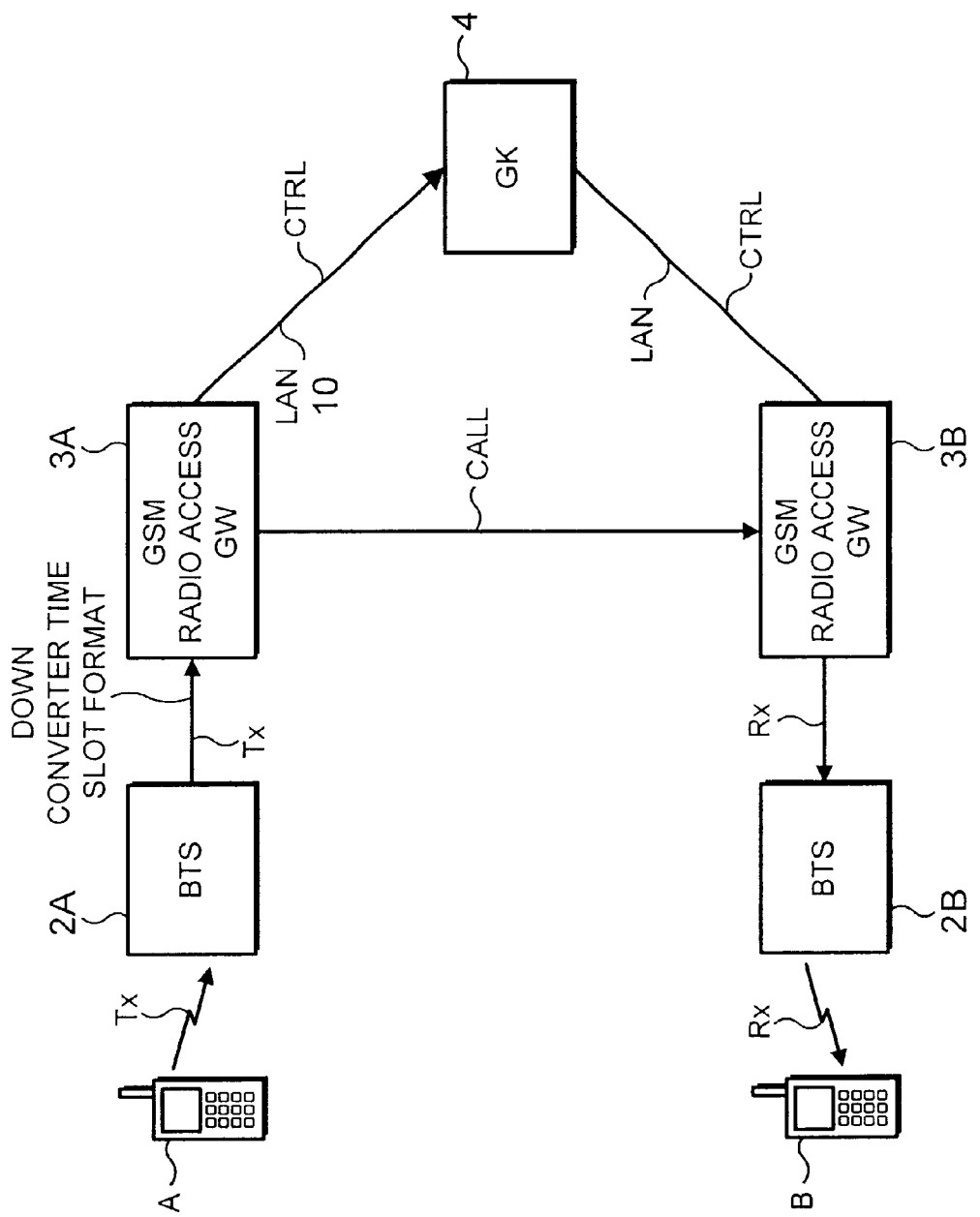
FIG. 1c is a block diagram illustrating the communication pathways used during a call between two internal mobile stations operating under the same gatekeeper.
Figure 1D:
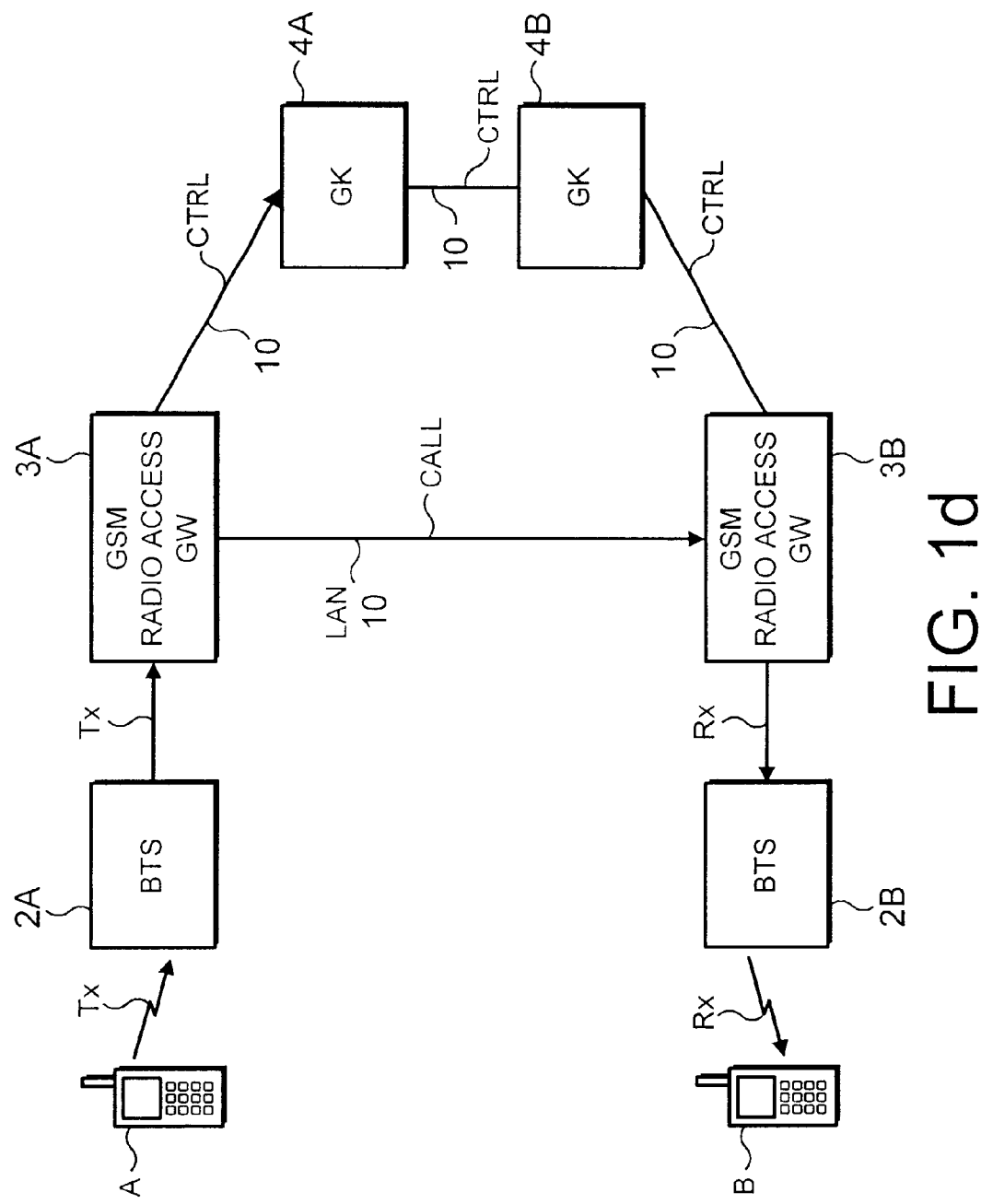
FIG. 1d is a block diagram illustrating the communication pathways used during a call between two internal mobile stations operating under different gatekeepers.

Calls which are completely internal to the WIO system are handled slightly differently. Reference is made to FIG. 1c.

The RF transmission signal TX, in timeslot format, transmitted by the first mobile station A is again sent to the base station 2A which performs down conversion of the signal. The down-converted signal is forwarded to the GSM radio gateway 3A which performs format conversion and generates control information as described above. From the GSM radio gateway 3A, the control signal CTRL is sent to the Gatekeeper 4 via the LAN 10. Paging is done only if the target/destination end system, that is mobile station has made a location update in the WIO system and the location information has not been used. The gatekeeper 4 thus, sends, via the LAN 10, a paging broadcast message identifying the mobile station B to each GSM radio access gateway 3 in its zone.

If the second mobile station B is operating in the same H.323 Zone as the first mobile station A, i.e. under the same gatekeeper, the gatekeeper 4 will receive a paging response signal from a destination GSM radio gateway 3B, i.e. the GSM radio gateway under which the mobile station B is operating, and the call is routed along the LAN 10 to that destination GSM radio gateway 3B.

The destination GSM radio gateway 3B converts the call signal CALL into a timeslot format. It is then sent, via its base transceiver station 2B which performs up-conversion to RF, to the second mobile station B.

If the gatekeeper 4 determines that the second mobile station B is in a different H.323 zone to the first mobile station A even if the location information has not been used yet, the first gatekeeper 4A (FIG. id) routes the control signal to a destination gatekeeper 4B via the LAN 10, i.e. the Gatekeeper under which the destination mobile station B is operating, which then also sends a paging broadcast message to each GSM radio access gateway in its zone. This gatekeeper under which the destination mobile station is operating may be determined via a directory information server or other location information database. If this can not be determined the target mobile station is not reachable. If the gatekeeper receives a paging response message from one of the GSM radio access gateways, the call signal is routed from the source GSM radio access gateway 3A to the destination GSM radio access gateway (in this case denoted by reference numeral 3B) via the LAN 10 and then out to the mobile station B, via its base transceiver station 2B, in a manner similar to that described above.

FIGS. 2 to 6 show, respectively, the communication pathways before, during and after a handover. The following description illustrates the handover of a first mobile station A from a first cell of the WIO network to a second cell of the WIO network (denoted by mobile station A') whilst in communication with a second mobile station B also located within the network.

In this context, the components of the first cell, i.e. the cell out of which mobile station A will move, are termed the source components while the components of the second cell, i.e. the cell into which mobile station A will move, are termed the target components. The components of the cell in which mobile station B is located are termed the destination components.

Figure 2:
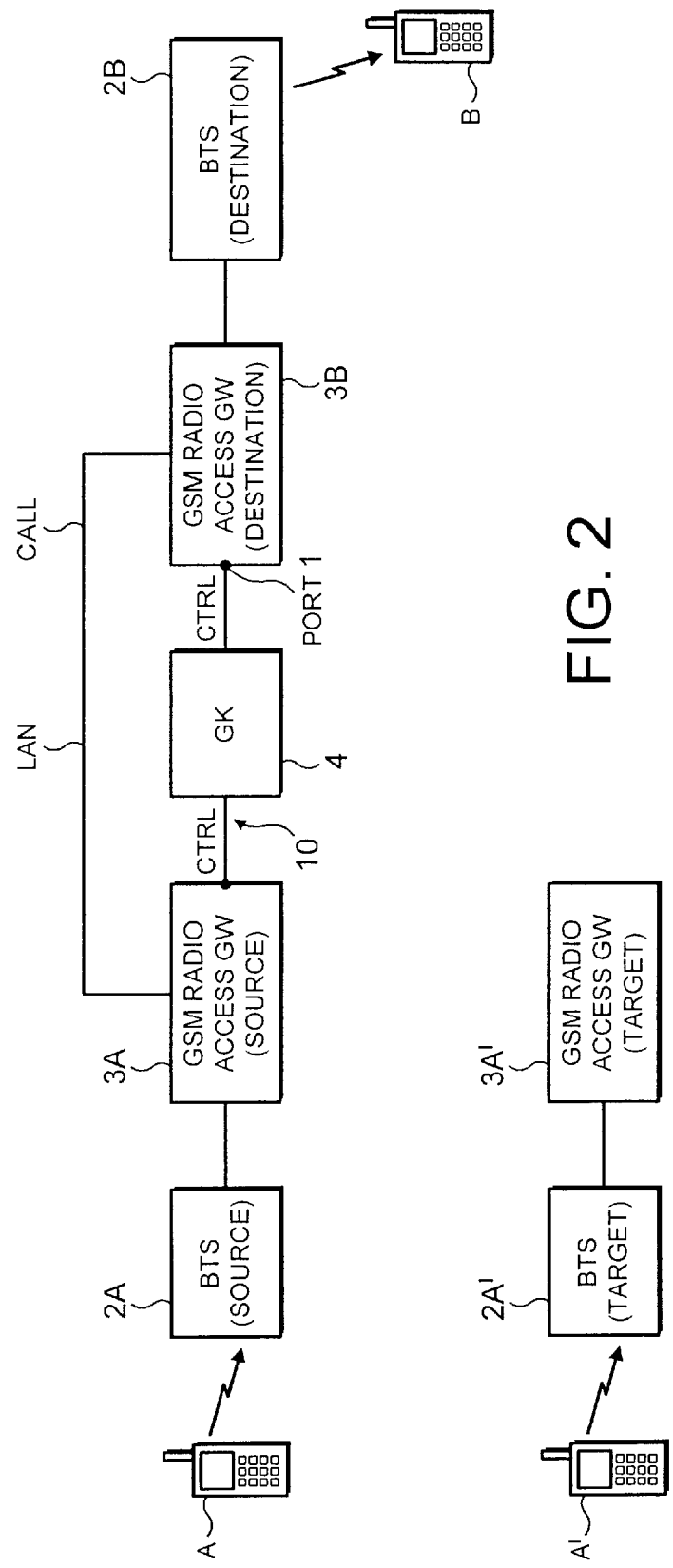
FIG. 2 is a block diagram illustrating the communication pathways between components of the WIO system before the mobile station handover.

As shown in FIG. 2, before the handover, mobile station A communicates with mobile station B by transmitting an RF, timeslot-based signal to the source base transceiver station 2A which down-converts the signal and sends it to the source GSM radio gateway 3A. The source GSM radio gateway 3A sends the control signal via the LAN 10 to the gatekeeper 4. The gatekeeper 4 identifies the destination mobile station as the mobile station B and the packet-based signal is routed, via the LAN 10, to a first port PORT1 of the destination GSM radio gateway 3B. The destination GSM radio gateway 3B converts the signal back into GSM time slot format and forwards it to the destination base transceiver station 2B which up-converts the signal to RF and transmits it to mobile station B.

When the source base station for the mobile station A determines, in a manner known per se and briefly described earlier, that a handover to another cell is required, the source base station sends a handover required indication message to the source GSM radio gateway 3A. The source base station generates, based on the levels of the signals which the mobile station has measured from the surrounding base transceiver stations, a list of suitable target base transceiver stations to which the mobile station could be handed over (the candidate list) and forwards it, on a radio frequency control channel, to the source GSM radio gateway 3A.

The source GSM radio gateway 3A converts the message HO indicating that handover is required and candidate list signal into a packet-based signal suitable for transmitting on the LAN 10 and then sends it to the gatekeeper 4 via the LAN 10. The gatekeeper 4 receives the message and the candidate list from the source GSM radio gateway 3A (FIG. 2).

Figure 3:
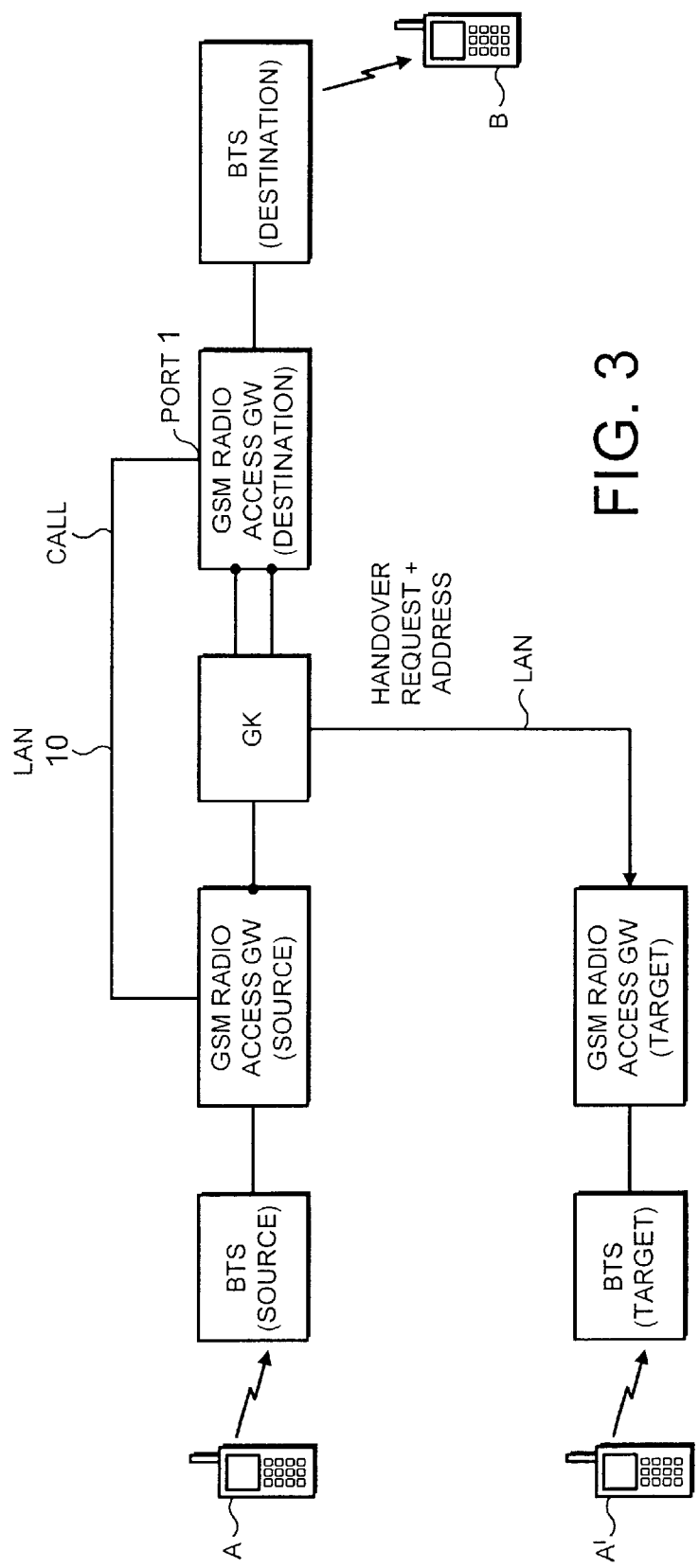
FIGS. 3 and 4 are block diagrams illustrating the communication pathways between components of the WIO system during the mobile station handover.
Figure 4:
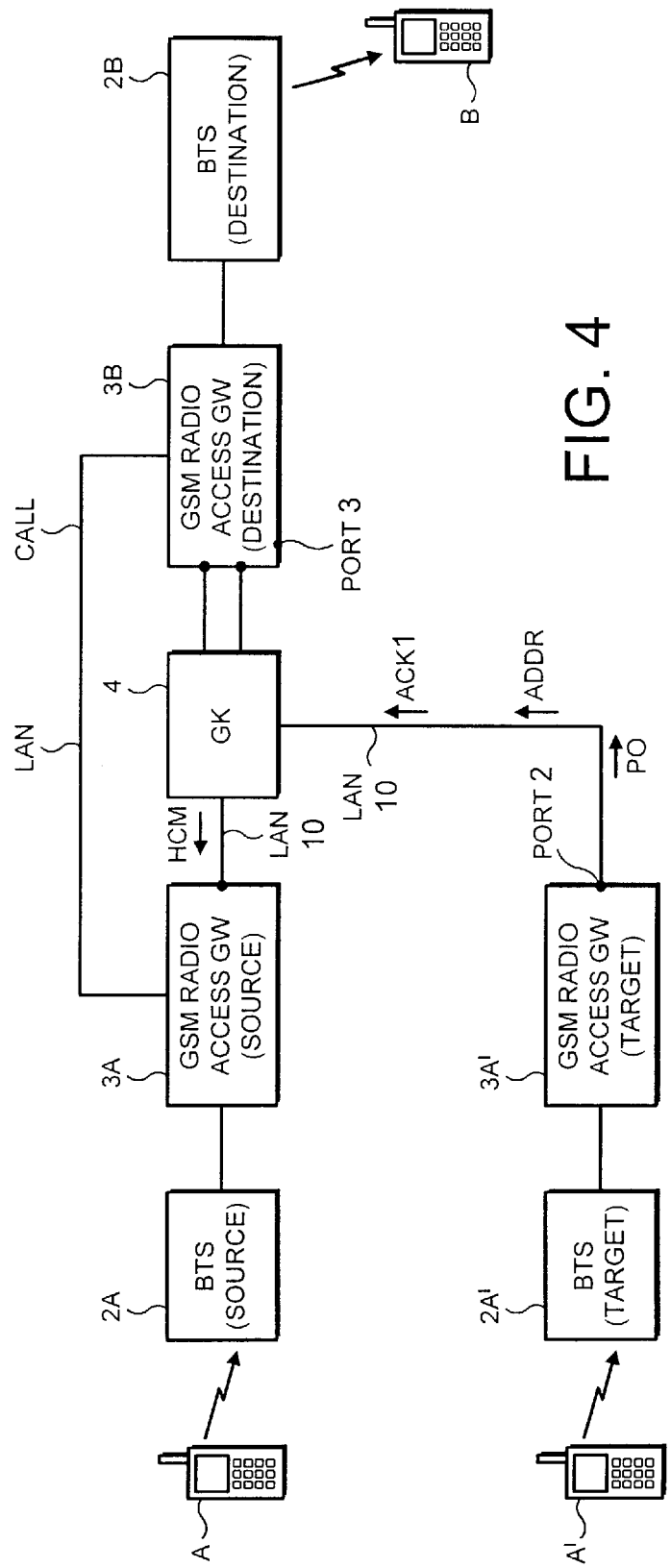

The gatekeeper 4 selects the first candidate target GSM radio gateway 21 on this candidate list and sends a handover request message HRM to it together with the address of the old or current port (port 1) for the incoming call stream of the destination GSM radio gateway 23 (FIG. 3).

If the target GSM radio gateway 3a' is able to accept the handover, it responds to the request by opening a port PORT 2 for the incoming call stream from the destination GSM radio gateway (FIG. 4) and then sending an acknowledgement message ACK 1, together with the address ADDR of the newly opened destination port PORT 2, to the gatekeeper 4 via LAN 10.

When the gatekeeper receives the acknowledgement message ACK 1 from the target GSM radio gateway 21, it instructs the destination GSM radio access gateway to allocate a new port, PORT 3, for receiving information from the target base station or GSM radio gateway. The gatekeeper also sends a handover command message HCM to the source GSM radio gateway instructing it to execute the handover. The source GSM radio gateway 3 converts this HCM message into a conventional GSM format signal such as a time-slot format signal and forwards it to the source base transceiver station.

Figure 5:
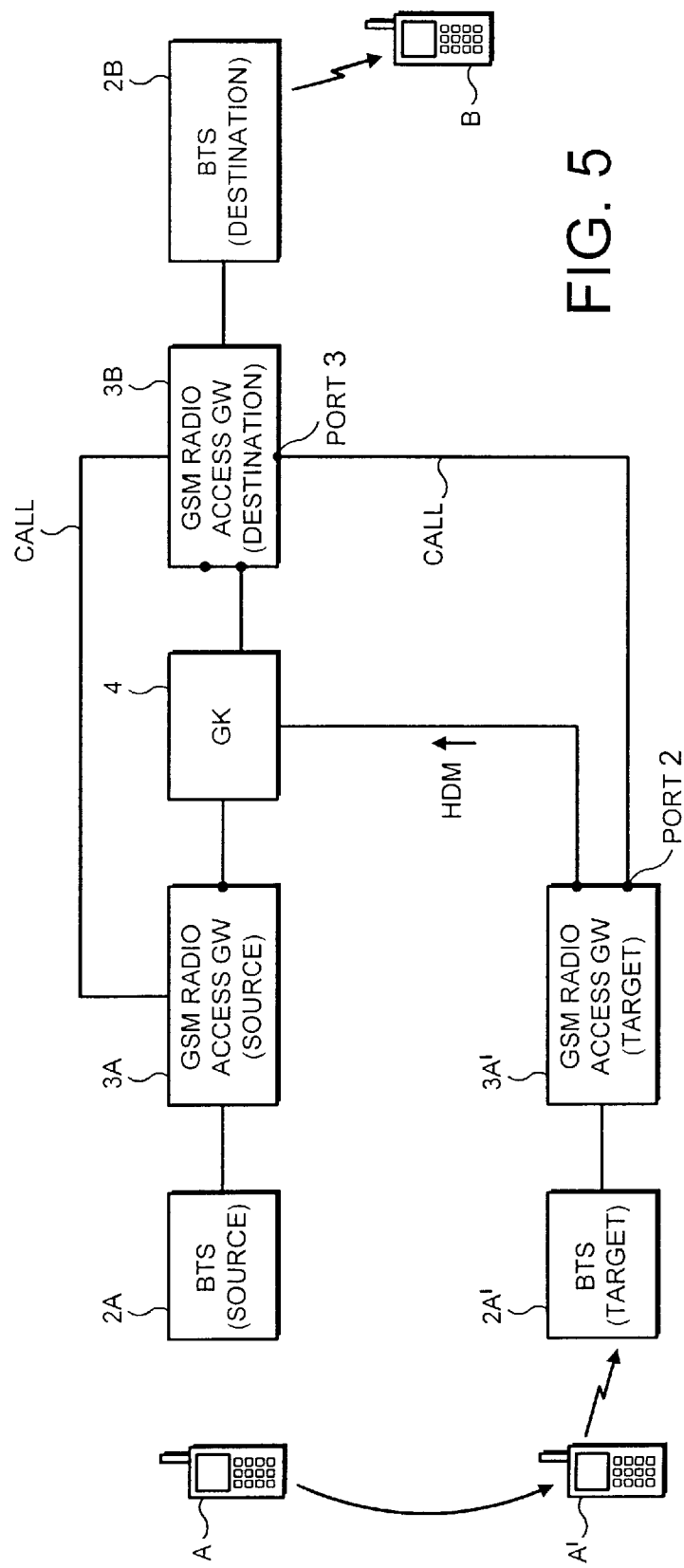
FIG. 5 is a block diagram illustrating the communication pathways between components of the WIO system after the mobile station handover.

The source base transceiver station then transmits this handover command message to the mobile station A and handover is executed. As shown in FIG. 5, the mobile station A (now represented by A') stops transmitting to the source base transceiver station 2A and begins transmitting to the target base transceiver station 2A'.

When the target GSM radio gateway 21 receives the first call data packets from the mobile station A, it sends a handover detected message HDM to the gatekeeper 4.

The call transmitted by the mobile station A is thus routed to the mobile station B via the target GSM radio gateway 3A' to the new port PORT 3 of the destination GSM radio gateway 3B. When the destination GSM radio gateway 3B receives a data packet from the target GSM radio gateway 21, it begins to send its data packets to the new port PORT 2 in the target GSM radio gateway 3A'.

When the target GSM radio gateway 21 and the mobile station A' have completed the handover, it sends a handover complete message to the gatekeeper which then begins to disconnect all of the original communications links between the source GSM radio gateway and the destination mobile cluster interface. The source GSM radio gateway 3 also closes its port and the destination GSM radio gateway 23 closes its original port PORT 1.

After the handover, therefore, the mobile station A' continues to communicate with destination mobile station B via the target base transceiver station 22 and the GSM radio gateway.

In summary, the destination GSM radio access gateway allocates a new port for the incoming media stream before handover is executed and the destination GSM radio access gateway is prepared to send the outgoing media stream from mobile B to a specified and allocated port in the target GSM radio access gateway. When handover occurs and the first packet from the target GSM radio access gateway is received, the destination GSM radio access gateway redirects outgoing packets to the target GSM radio access gateway and closes the old port for the incoming media stream. The gatekeeper then releases all connections to the source GSM radio access gateway.

It can be seen, therefore, that embodiments of this invention reduces the risk of data loss during the handover procedure since the original communications links between the source GSM radio gateway 3 and the destination GSM radio gateway 23 are not disconnected until communication has been positively established between the target GSM radio gateway 21 and the destination GSM radio gateway 23.

It should be noted that this embodiment is not limited to handovers entirely within the WIO system. For example, such a procedure may be implemented in a handover of a mobile station from a cell of the WIO system to a cell of an external network. In this case, the target GSM radio gateway 21 would be represented by the GSM gateway. Also in this case, the setting up of the communications links to the appropriate cell in the external network may be controlled by the mobile switching center.

As has been described, the mobile station A communicates with the mobile station B by specified communication channels which comprise a call channel defined by RF specific parameters between the mobile stations A and B and their respective base transceiver stations and a logical or routing channel which determines the routing of packets via the LAN 10. The establishment of logical channels can be effected by one of the following routes within the handover procedure described above.

The destination GSM radio access gateway may not allocate a new port for receiving data from the target radio access gateway. Rather the new target port in the target GSM radio access gateway is identified to the destination GSM radio access gateway.

According to one possibility, two distinct unidirectional logical channel connections are made, one from mobile station A to mobile station B, followed by one in the reverse direction from mobile station B to mobile station A. According to this approach, an existing logical channel exists from the is source GSM radio access gateway 3A to the destination GSM radio access gateway 3B. A replacement logical channel connection from the target GSM radio access gateway 3A' to the destination GSM radio access gateway 3B is established and is indicated in the gatekeeper by a "replacement for" parameter. However, mobile station 2 does not replace the channels until user data traffic on the new channel is recognised. As soon as call data on the new channel has been recognised, the mobile station B closes the old channel and requests a new replacement channel for the reverse direction. The target gateway 3A' gives the configuration of the new replacement channel for the reverse direction after handover is executed.

It is also possible to use embodiments of the present invention in a context where the channels are bidirectional. The gatekeeper will need to send a second message to the destination GSM radio access gateway for confirmation on the change in the modified bidirectional channel. When the destination GSM radio access gateway receives this confirmation message, it is permitted to start sending the outgoing media stream to the new channel.

A bidirectional logical channel connection may be made in one step from mobile station A to mobile station B. In this case, when a logical channel configuration is provided in the forward direction (from MSA to MSB), the configuration of a logical channel in the reverse direction is also included. When the mobile station B responds to the mobile station A with an acknowledgement of the new open logical channel, the logical channel configuration in the reverse direction is granted. When the handover execution is effected, the mobile station B receives a confirmation signal indicating that the new logical channel shall be used.

Whilst embodiments of the present invention have been described in the context of a GSM system, embodiments of the present invention can be used with any other access method including close division multiple access or other spread spectrum techniques, time division multiple access, frequency division multiple access and hybrids of any one or more systems.

One of the parties to the call may be wired or stationary, in alternative embodiments of the present invention.

What is claimed is:

1. A method of effecting handover in a communications network of a first mobile station between a source gateway and a target gateway, the first mobile station being engaged in a call with a second mobile station using a destination gateway, wherein the second mobile station is connected to the destination gateway; wherein the source gateway, the target gateway and the destination gateway are connected by a switched packet communication path for conveying call data packets and wherein the switched packet communication path between the source gateway and a source port at the destination gateway is a first bi-directional logical communication channel for conveying call data between the first and second mobile stations; the method comprising:

i) sending call data packets from the first mobile station to a source port at the destination gateway on the first bi-directional logical communication channel;

ii) opening a target port at the destination gateway for communication with the target gateway;

iii) opening a second bidirectional logical communication channel between the target gateway and the target port at the destination gateway;

iv) routing call data packets from the first mobile station via the target gateway to the target port on the second bi-directional logical communication channel;

v) detecting receipt of said call data packets at the target port and then, responsive to such detection;

vi) routing call data packets from the second mobile station via the destination gateway to the target gateway on the second bi-directional logical communication channel in the reverse direction for conveying the call data packets from the second mobile station to the first mobile station; and vi) closing the source port at the destination gateway.

2. A method as claimed in claim 1, wherein after step vii), the source port at the destination gateway is redirected to another destination.

3. A method as claimed in claim 2, wherein the source port is redirected to a destination of the target gateway.

4. A method according to claim 1, wherein opening and closing of the source and target ports is controlled by a central controller connected to the switched packet communication path.

5. A method according to claim 1, wherein step ii) is responsive to a handover required indication issued by the first mobile station.

6. A method according to claim 1, which comprises a step of converting RF data received from the first and second mobile stations into call data packets to be conveyed by the switched packet communication path.

7. A communications network comprising:

a plurality of gateways which are arranged such that in use, one gateway is a source gateway, a second gateway is a target gateway and a third gateway is a destination gateway, said gateways are connected via a switched packet communication path for conveying call data packets between the gateways, at least one gateway being associated with circuitry for converting RF data from a mobile station to call data packets for transmission via the switched packet communication path, and each gateway having a set of selectable ports for transmitting and receiving call data packets on the switched packet communication path, wherein the destination gateway comprises a source port for receiving call data packets from the mobile station and wherein the switched packet communication path between the source gateway and a source port at the destination gateway is a first bi-directional logical communication channel, the network further comprising:

a central controller connected to the switched packet communication path and operative responsive to a handover required indication from a mobile station operating in the network to selectively open a target port at the destination gateway for communication with the target gateway, to open a second bi-directional logical communication channel between the target gateway and the target port at the destination gateway, to route call data packets via the target gateway to the target port on the second bi-directional communication channel, to detect receipt of said call data packets at the target port, and then responsive to the detection, to route call data packets from the mobile station via the destination gateway to the target gateway on the second bi-directional logical communication channel in the reverse direction for conveying the call data packets from the mobile station and to close the source port at the destination gateway to implement handover of the mobile station from the source gateway to the target gateway.

8. A method of effecting handover in a communications network of a first mobile station between a source gateway and a target gateway, the first mobile station being engaged in a call with a second mobile station using a destination gateway, wherein the second mobile station is connected to the destination gateway, and wherein the source gateway; wherein the target gateway and the destination gateway are connected by a switched packet communication path for conveying call data packets; and wherein the switched packet communication path between the source gateway and a source port at the destination gateway is a first uni-directional logical communication channel for conveying call data packets between the first and second mobile stations, the method comprising:

i) sending call data packets from the first mobile station to the source port at the destination gateway on the first uni-directional logical communication channel;

ii) opening a target port at the destination gateway for communication with the target gateway;

iii) opening a second uni-directional logical communication channel between the target gateway and the target port at the destination gateway;

iv) routing call data packets from the first mobile station via the target gateway to the target port on the second uni-directional logical communication channel;

v) detecting receipt of said call data packets at the target port and then, responsive to such detection;

vi) closing the first uni-directional channel and requesting a third uni-directional logical communication channel in the reverse direction;

vii) routing call data packets from the second mobile station via the destination gateway to the target gateway on the third uni-directional logical communication channel; and viii) closing the source port at the destination gateway.

9. A communications network comprising:

a plurality of gateways which are arranged such that in use, one gateway is a source gateway, a second gateway is a target gateway and a third gateway is a destination gateway, said gateways connected via a switched packet communication path for conveying call data packets between the gateways, at least one gateway being associated with circuitry for converting RF data from a mobile station to call data packets for transmission via the switched packet communication path, and each gateway having a set of selectable ports for transmitting and receiving call data packets on the switched packet communication path, wherein the destination gateway comprises a source port for receiving call data packets from the mobile station and wherein the switched packet communication path between the source gateway and a source port at the destination gateway is a first uni-directional logical communication channel, the network further comprising:

a central controller connected to the switched packet communication path and operative responsive to a handover required indication from a mobile station operating in the network to selectively open a target port at the destination gateway for communication with the target gateway, to open a second uni-directional logical communication channel between the target gateway and the target port at the destination gateway, to route call data packets via the target gateway to the target port on the second uni-directional communication channel, to detect receipt of said call data packets at the target port, and then responsive to the detection, to close the first uni-directional channel and requesting a third uni-directional logical communication channel in the recerse direction, to route call data packets from the mobile station via the destination gateway to the target gateway on the third uni-directional logical communication channel and to close the source port at the destination gateway to implement handover of the mobile station from the source gateway to the target gateway.

* * * * *